(12) United States Patent
Conway et al.

(10) Patent No.: US 11,981,294 B2
(45) Date of Patent: May 14, 2024

(54) HEADLAMP HEATER CONTROL

(71) Applicant: PACCAR Inc, Bellevue, WA (US)

(72) Inventors: Scott M. Conway, Flower Mound, TX (US); G. Thomas Checketts, Denton, TX (US)

(73) Assignee: PACCAR Inc., Bellevue, WA (US)

( * ) Notice: Subject to any disclaimer, the term of this patent is extended or adjusted under 35 U.S.C. 154(b) by 499 days.

(21) Appl. No.: 17/237,720

(22) Filed: Apr. 22, 2021

(65) Prior Publication Data

US 2021/0339709 A1 Nov. 4, 2021

Related U.S. Application Data

(60) Provisional application No. 63/017,855, filed on Apr. 30, 2020.

(51) Int. Cl.
*B60S 1/02* (2006.01)
*B60Q 1/00* (2006.01)
*B60Q 1/04* (2006.01)
*B60R 16/023* (2006.01)
*B60S 1/04* (2006.01)
*F21S 45/60* (2018.01)
*B60H 1/00* (2006.01)
*G01K 3/00* (2006.01)

(52) U.S. Cl.
CPC ............ *B60S 1/023* (2013.01); *B60Q 1/0017* (2013.01); *B60Q 1/04* (2013.01); *B60R 16/023* (2013.01); *B60S 1/04* (2013.01); *F21S 45/60* (2018.01); *B60H 1/00821* (2013.01); *G01K 3/005* (2013.01)

(58) Field of Classification Search
CPC . B60S 1/023; B60S 1/04; B60S 1/606; B60Q 1/0017; B60Q 1/04; B60R 16/023; F21S 45/60; B60H 1/00821; B60H 1/00785; G01K 3/005
See application file for complete search history.

(56) References Cited

U.S. PATENT DOCUMENTS

| | | | |
|---|---|---|---|
| 11,066,047 B1 | 7/2021 | Keller | |
| 2016/0215952 A1 | 7/2016 | Dunn | |
| 2016/0363286 A1 | 12/2016 | Deering | |
| 2017/0234503 A1 | 8/2017 | Buffone | |
| 2018/0363878 A1 | 12/2018 | Portluri | |

(Continued)

FOREIGN PATENT DOCUMENTS

CN 109185826 1/2019

*Primary Examiner* — Michael V Kerrigan
(74) *Attorney, Agent, or Firm* — Merchant & Gould P.C.

(57) ABSTRACT

Examples of the present disclosure relate to techniques for headlamp heater control. In examples, a headlight assembly comprises a heater, which is used to prevent or remove condensation/precipitation on a lens of the headlamp assembly. Given it may be difficult for an individual to know when to manually turn the headlamp heater on, an electronic control unit (ECU) may evaluate a set of rules to determine when to automatically enable or disable the headlamp heater. The rules may be associated with atmospheric conditions outside the vehicle, the state of the vehicle (e.g., whether windshield wipers are turned on, whether windshield defog is enabled, whether a mirror heater is turned on, etc.), and/or user input received by an ECU of the vehicle, among other examples.

20 Claims, 6 Drawing Sheets

(56) References Cited

U.S. PATENT DOCUMENTS

| | | |
|---|---|---|
| 2019/0017676 A1 | 1/2019 | Van Straten |
| 2019/0017677 A1 | 1/2019 | Beauchamp |
| 2019/0086054 A1 | 3/2019 | Iwao |
| 2019/0283658 A1 | 9/2019 | Furui |
| 2020/0056756 A1 | 2/2020 | Kim |
| 2020/0072435 A1 | 3/2020 | Mayer |
| 2020/0247708 A1 | 8/2020 | Priese |
| 2020/0300440 A1* | 9/2020 | Monpremier ........... F21S 43/14 |
| 2020/0340660 A1 | 10/2020 | Van Straten |
| 2021/0088197 A1 | 3/2021 | Koulouh |
| 2021/0148539 A1 | 5/2021 | Ting |
| 2021/0302006 A1 | 9/2021 | Deng |
| 2021/0341121 A1 | 11/2021 | Conway |

* cited by examiner

HEADLAMP HEATER CONTROL

CROSS-REFERENCE TO RELATED APPLICATIONS

This application claims the benefit of U.S. Provisional Application No. 63/017,855, filed Apr. 30, 2020, the complete disclosure of which is hereby incorporated herein by reference in its entirety.

BACKGROUND

Accurately controlling a headlamp heater has implications for safety, energy consumption, and the lifespan of the associated headlamp assembly, among other examples. However, the variability of scenarios in which a headlamp heater should or should not be used makes such control difficult.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure relate to techniques for headlamp heater control. In examples, a headlight assembly comprises a heater, which is used to prevent or remove condensation/precipitation on a lens of the headlamp assembly. Given that it may be difficult for an individual to know when to manually turn the headlamp heater on and off, an electronic control unit (ECU) may evaluate a set of rules to determine when to automatically enable or disable the headlamp heater. The rules may be associated with atmospheric conditions outside the vehicle, the state of the vehicle (e.g., whether windshield wipers are turned on, whether windshield defog is enabled, whether a mirror heater is turned on, etc.), and/or user input received by an ECU of the vehicle, among other examples.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
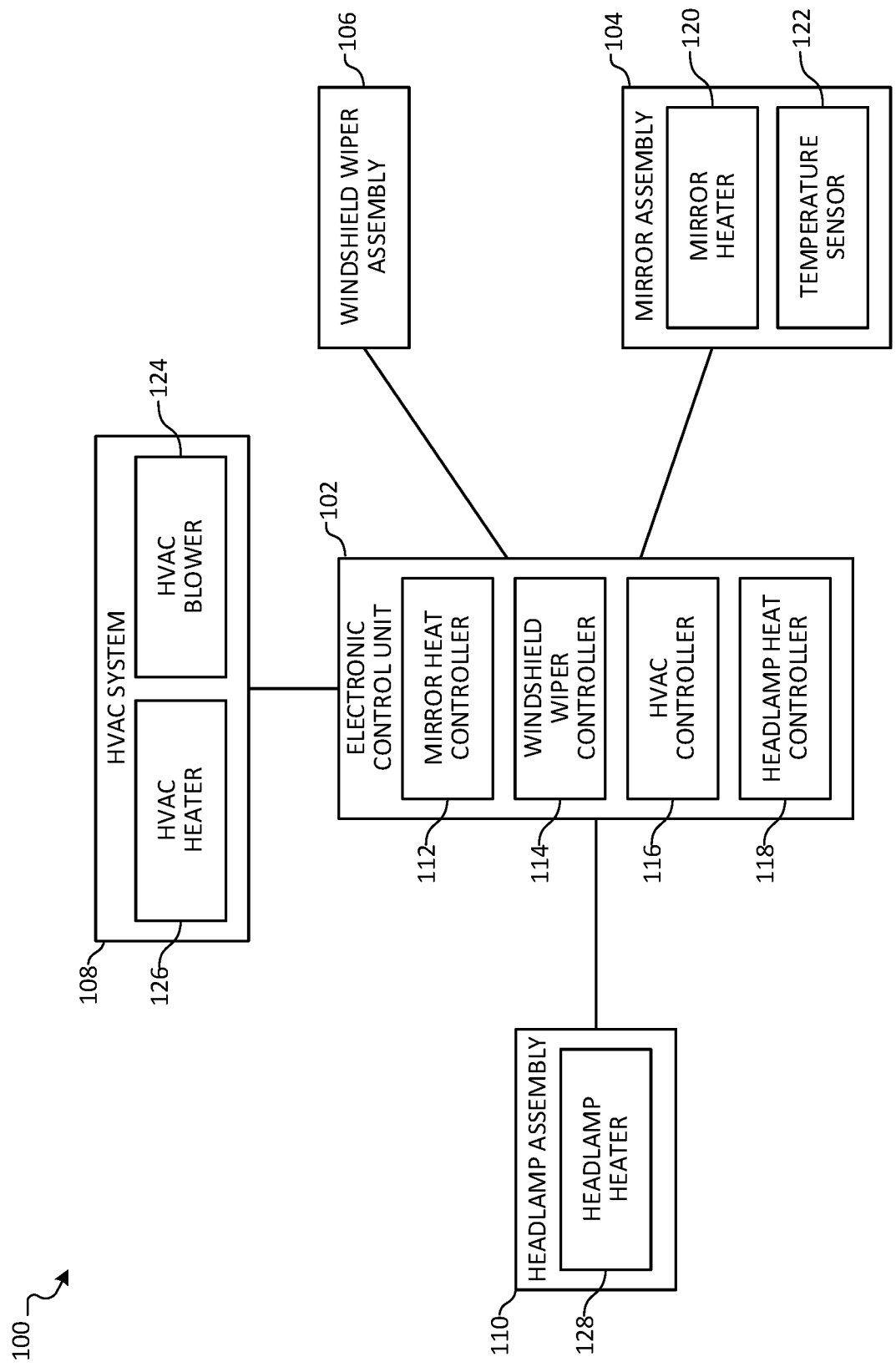
FIG. 1 illustrates an overview of an example system in which aspects of headlamp heater control are practiced.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

A headlamp assembly may comprise a light source, a lens, and a heater that heats at least a part of the lens, thereby preventing or removing condensation/precipitation that may otherwise obstruct a beam pattern of the light source. However, using the heater when not needed unnecessarily wastes energy (thereby potentially increasing fuel consumption of the vehicle) and may cause the headlamp assembly to wear out or otherwise require service prematurely (e.g., excess heat may reduce the lifespan of the light source, thermal shock may damage the lens, the heater may experience reduced functionality or may fail, etc.). Similarly, failing to use the heater when condensation or precipitation is present may impact the beam pattern projected by the light source, which may reduce the effectiveness of the headlamp and impact overall safety. However, it may not be possible for a driver to determine when to manually enable or disable the headlamp heater. Thus, automatic control of the headlamp heater may offer numerous benefits and have a variety of other implications.

Accordingly, aspects described herein relate to techniques for headlamp heater control. For example, the determination whether to enable or disable one or more headlamp heaters of a vehicle may be based at least in part on a set of rules relating to, for example, the outside air temperature, the state of a windshield wiper system, the state of a mirror heater, and/or the state of a heating, ventilation, and air conditioning (HVAC) system, among other examples.

In examples, the light source used by a headlamp assembly is one or more light-emitting diodes (LEDs), lasers, high-intensity discharge lamps, and/or tungsten-halogen lamps. The headlamp assembly may further comprise a heater, such as in scenarios in which the light source does not generate enough heat to prevent condensation or precipitation. As an example, the heater may comprise a fan (e.g., to circulate air within the assembly, move air from elsewhere, etc.), resistive wire integrated into the lens of the headlamp assembly, and/or a heating element (e.g., a ceramic infrared heating element, coiled wire, etc.). While example light sources and heaters are provided, it will be appreciated that any of a variety of other technologies may be used according to aspects described herein in other examples.

A headlamp assembly is adapted to receive power from a power source of a vehicle (e.g., a battery, an alternator, etc.). In examples, a light source and heating element of the headlamp assembly are controllable via one or more control elements of the vehicle. For example, the light source or heating element may be controlled manually via a switch, potentiometer, etc., or automatically by an electronic control unit (ECU) according to aspects described herein, among other examples. It will be appreciated that the light source and heating element may be individually controllable.

For example, an ECU may evaluate a set of rules to determine whether to enable or disable a heater of a headlamp assembly. The rules may be associated with atmospheric conditions outside the vehicle, a predetermined state of the vehicle (e.g., the vehicle overall, a control unit of the vehicle, etc.), and/or user input received by an ECU of the vehicle, among other examples. In examples, atmospheric conditions (e.g., temperature, humidity, barometric pressure, etc.) are determined using one or more sensors of the vehicle or may be determined from any of a variety of other sources, such as the Internet.

A vehicle state may be associated with a windshield wiper assembly (e.g., whether the windshield wipers are turned on, the rate at which the windshield wipers are operating, etc.), a mirror heater of a mirror assembly, and/or an HVAC system (e.g., utilization of the blower, a temperature setting, whether the HVAC system is set to defog the windshield, etc.). In examples, aspects of a vehicle state are determined via a controller area network (CAN) bus. For example, an ECU may identify relevant data communicated by such systems via the CAN bus or, as another example, may request data from a system via the CAN bus accordingly. User input (e.g., from a graphical user interface, from a physical control element such as a button or slider, etc.) and/or data relating to an atmospheric condition may similarly be received or otherwise accessed via the CAN bus. In other examples, a local interconnect network (LIN) bus or an Ethernet network may be used. Thus, while example communication techniques are described herein, it will be appreciated that any of a variety of other alternative or additional techniques may be used in other examples.

FIG. 1 illustrates an overview of an example system 100 in which aspects of headlamp heater control are practiced. As illustrated, system 100 comprises electronic control unit (ECU) 102, mirror assembly 104, windshield wiper assembly 106, HVAC system 108, and headlamp assembly 110. ECU 102 comprises mirror heat controller 112, windshield wiper 114, HVAC controller 116, and headlamp heat controller 118. Mirror heat controller 112 is configured to turn mirror heater 120 on or off and may provide vehicle state information indicating whether mirror heater 120 is on. Similarly, windshield wiper controller 114 controls windshield wiper assembly 106, for example turning windshield wiper assembly 106 on and off, as well as controlling the speed and/or interval with which windshield wiper assembly 106 operates, among other examples. Windshield wiper controller 114 may provide vehicle state information relating to windshield wiper assembly 106 accordingly. HVAC controller 116 controls HVAC system 108, for example setting a temperature of HVAC heater 126 or setting a speed of HVAC blower 124. In examples, HVAC controller 116 provides vehicle state information relating to HVAC system 108 accordingly.

ECU 102 is further illustrated as comprising headlamp heat controller 118, which controls headlamp heater 128 of headlamp assembly 110 according to aspects described herein. For example, headlamp heat controller 118 may receive an indication of user input associated with turning headlamp heater 128 on or off, in response to which headlamp heat controller 118 controls headlamp heater 128 accordingly. Example user input includes, but is not limited to, actuation of a graphical control element in a graphical user interface or actuation of a physical control element such as a switch or slider, among other examples. In some examples, the user input is an indication to perform an electronic self-test, in response to which headlamp heater 128 is turned on.

In other examples, headlamp heat controller 118 automatically controls headlamp heater 128 based on a set of rules. For example, a rule may specify that headlamp heater 128 should be turned on when HVAC system 108 is in a predetermined state (e.g., when it is configured to defog a windshield) and when the outside air temperature (e.g., as may be determined from temperature sensor 122 of mirror assembly 104, etc.) is within a predetermined temperature range. For example, the predetermined temperature range may be selected based on conditions in which condensation is likely to form (e.g., generally, on the inside of a lens of headlamp assembly 110, etc.), such as when the outside air temperature is between −9 degrees and 20 degrees Celsius. In examples, headlamp heat controller 118 determines that HVAC system 108 is in the predetermined state to defog the windshield based on vehicle state information associated with HVAC controller 116 or, as another example, when an indication is received from HVAC controller 116. For example, the vehicle state may indicate that HVAC heater 126 is set to an output or a temperature above a predetermined threshold (e.g., HVAC heater 126 output is greater than 90%) and that HVAC blower 124 is set to a speed above a predetermined speed threshold (e.g., greater than 90%). As another example, the vehicle state may indicate that a control element associated with a windshield defog operating mode of HVAC system 108 has been actuated by a user.

Another example rule may specify that headlamp heater 128 should be turned on when windshield wiper assembly 106 is in a predetermined state (e.g., windshield wiper assembly 106 is active, operating at a certain interval, etc.) and when the outside air temperature is within a predetermined temperature range. For example, the predetermined temperature range may be selected based on conditions in which it is possible for precipitation to freeze (e.g., generally, on a lens of headlamp assembly 110, etc.), such as when the outside air temperature is between −9 degrees and 5 degrees Celsius. In examples, headlamp heat controller 118 determines that windshield wiper assembly 106 is in the predetermined state based on vehicle state information associated with windshield wiper controller 114 or, as another example, when an indication is received from windshield wiper controller 114. For example, the vehicle state may indicate that windshield wiper assembly 106 is operating at a certain speed. As another example, the vehicle state indicates that a control element associated with windshield wiper assembly 106 has been actuated by a user.

A further example rule may specify that headlamp heater 128 should be turned on when mirror heater 120 is in a predetermined state, such as when it is turned on (e.g., as may be controlled by mirror heat controller 112), and the outside air temperature is within a predetermined range. Given mirror heater 120 may be used in a wide variety of scenarios, the predetermined temperature range may be selected based on temperatures that are not likely to adversely affect headlamp assembly 110. For example, the low temperature of the predetermined range may be a thermal shock temperature below which a lens of headlamp assembly 110 is likely to experience thermal shock (e.g., −30 degrees Celsius). As another example, the high temperature of the predetermined range may be selected based on an operational temperature above which a light source (and/or other components) of headlamp assembly 110 may experience operational issues, such as a decreased lifespan, temporary overheating, etc. (e.g., 20 degrees Celsius). In examples, headlamp heat controller 118 determines that mirror heater 120 is active based on vehicle state information associated with mirror heat controller 112 or when an indication is received from mirror heat controller 112. As another example, the vehicle state indicates that a control element associated with mirror heater 120 has been actuated by a user.

In some examples, headlamp heat controller 118 may automatically turn on headlamp heater 128 for the time during which a rule is satisfied or, in other examples, for a predetermined amount of time after a rule is satisfied (e.g., after the rule was first satisfied, last satisfied, etc.). For example, headlamp heat controller 118 may configure headlamp heater 128 to be on as long as mirror heater 120 is turned on and the outside air temperature is within the associated predetermined range. As another example, headlamp heat controller 118 may turn on headlamp heater 128 for a predetermined amount of defogging time when HVAC system 108 begins defogging a windshield and the outside air temperature is within the associated predetermined range, as it is likely that the windshield will be defogged more quickly than headlamp assembly 110, such that HVAC system 108 will stop defogging the windshield sooner than headlamp heater 128 should be turned off In such examples, the predetermined amount of defogging time may be tuned based at least in part on the type of headlamp heater 128, as certain heater technology may operate more quickly than another heater technology. Headlamp heat controller 118 may evaluate each rule individually, such that headlamp heater 128 is turned on in response to any rule being satisfied or, in other examples, rules may be interdependent such that headlamp heater 128 is turned on based on identifying multiple rules that are satisfied contemporaneously.

In examples, ECU 102 communicates with mirror assembly 104, windshield wiper assembly 106, HVAC system 108, and/or headlamp assembly 110 via a CAN bus. In other examples, ECU 102 controls one or more relays associated with mirror assembly 104, windshield wiper assembly 106, HVAC system 108, and/or headlamp assembly 110 in addition to or as an alternative to using the CAN bus. For example, headlamp heat controller 118 of ECU 102 may control a relay associated with headlamp heater 128, thereby enabling ECU 102 to turn headlamp heater 128 on or off.

While ECU 102 is illustrated as comprising controllers 112-118, it will be appreciated that the controllers and associated functionality described herein may be distributed according to any of a variety of other techniques. For example, HVAC controller 116 may be part of HVAC system 108. As another example, mirror heat controller 112 may instead be part of mirror assembly 104. In such examples, HVAC controller 116 and mirror heat controller 112 may communicate with ECU 102 via a CAN bus (or otherwise) according to aspects described herein, among other communication techniques.

It will be appreciated that while system 100 is illustrated as comprising a certain number of elements, any number of elements may be used in other examples. For example, multiple headlamp assemblies 110 and/or headlamp heaters 128 may be used. Similarly, temperature sensor 122 need not be provided as part of mirror assembly 104 and may instead be located in any of a variety of other positions or, in instances where atmospheric condition data is accessed from another source, temperature sensor 122 of mirror assembly 104 may be omitted.

Figure 2B:
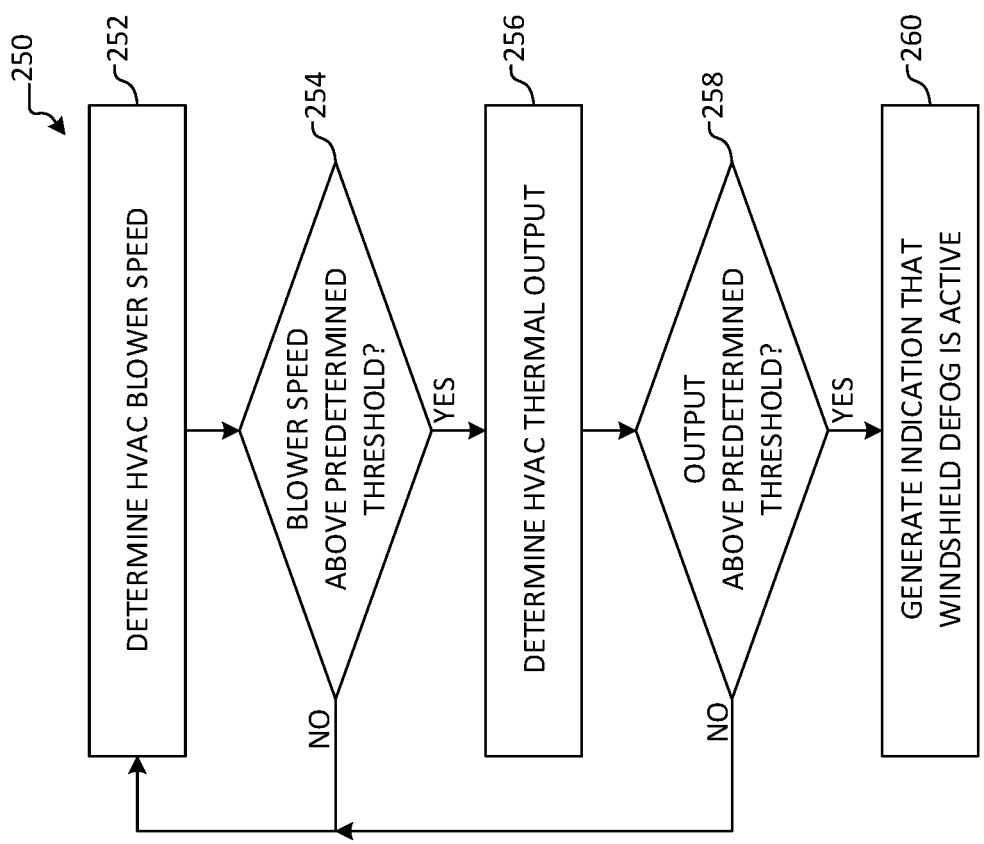
FIG. 2B illustrates an overview of an example method for determining HVAC state.
Figure 2A:
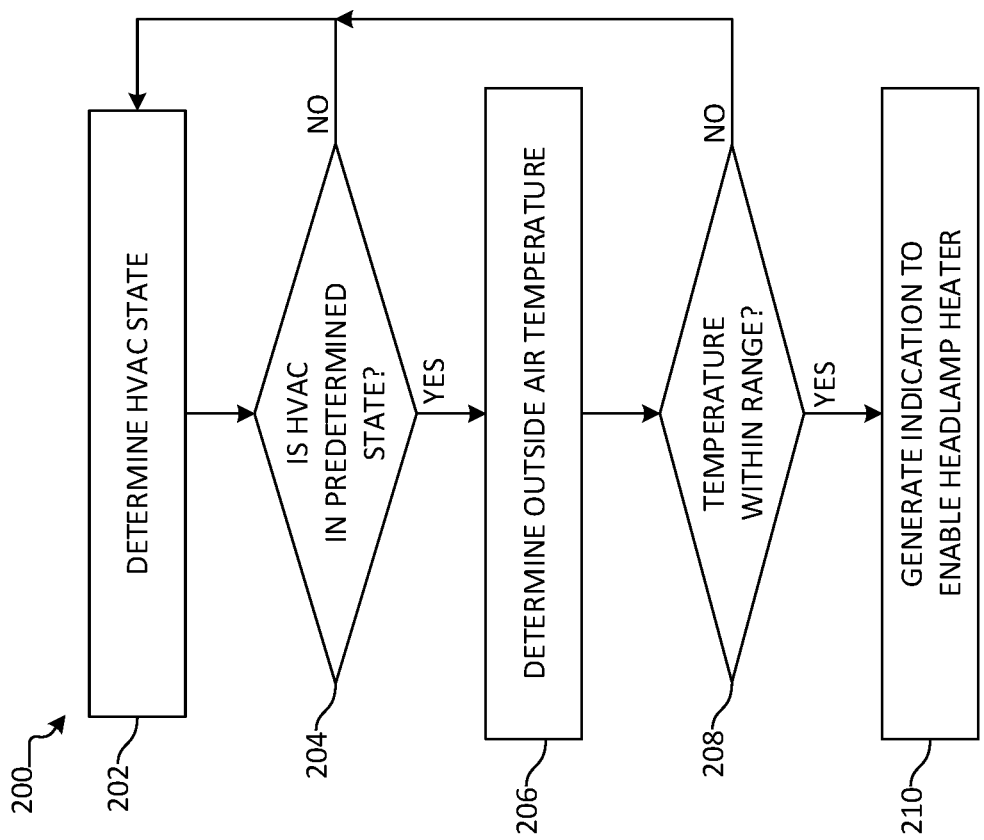
FIG. 2A illustrates an overview of an example method for enabling a headlamp heater based at least in part on HVAC state.

FIG. 2A illustrates an overview of an example method 200 for enabling a headlamp heater based at least in part on an HVAC state. In examples, method 200 is performed by an ECU. For example, method 200 may be performed by headlamp heat controller 118 of ECU 102 in FIG. 1 when the headlamp heat controller is processing a rule. Method 200 begins at operation 202, where an HVAC state is determined. In examples, the HVAC state is determined based on vehicle state information transmitted via a CAN bus that is associated with an HVAC system (e.g., HVAC system 108 and/or HVAC controller 116 in FIG. 1). In other examples, the determination may be made by requesting vehicle state information from the HVAC system accordingly. Example vehicle state information includes, but is not limited to, an output or temperature setting of an HVAC heater (e.g., HVAC heater 126 in FIG. 1), a speed setting of an HVAC blower (e.g., HVAC blower 124), and/or a state of a control element associated with a windshield defog operating mode. Additional examples of such aspects are described below with respect to method 250 in FIG. 2B. Accordingly, it will be appreciated that any of a variety of techniques may be used to determine the state of an HVAC system.

Flow progresses to determination 204, where it is determined whether the HVAC system is in a predetermined state, such as whether the HVAC system is configured to defog the windshield based on the determined HVAC state from operation 202. For example, the determination may comprise comparing the output or temperature setting of the HVAC heater to a predetermined threshold (e.g., an output greater than 90%), the speed setting of the HVAC blower to a predetermined speed threshold (e.g., greater than 90%), and/or whether the control element was actuated by a user so as to enable the windshield defog operating mode of the HVAC system. If it is determined that the HVAC system is not in the predetermined state (e.g., windshield defog is not active), flow branches "NO" and returns to operation 202. Thus, it will be appreciated that method 200 may be performed continually or repeatedly. In other examples, method 200 may terminate and may instead be periodically performed or may be performed in response to an event (e.g., when an indication is received from an HVAC controller, when a user input is received, etc.).

If, however, it is determined that the HVAC system is in the predetermined state (e.g., that windshield defog is active), flow instead branches "YES" to operation 206, where the outside air temperature is determined. In examples, the outside air temperature is determined from a temperature sensor of the vehicle, such as temperature sensor 122 of mirror assembly 104 in FIG. 1. It will be appreciated that the outside air temperature may be determined from any of a variety of other sources. In some examples, multiple temperature sensors are used, such that temperature readings may be averaged, the maximum temperature reading may be used, or the minimum temperature reading may be used, among other examples.

Flow progresses to determination 208, where it is determined whether the outside air temperature is within a predetermined temperature range. For example, the predetermined temperature range may be selected based on conditions in which condensation is likely to form (e.g., generally, on the inside of a lens of a headlamp assembly, etc.), such as when the outside air temperature is between −9 degrees and 20 degrees Celsius. Such a range may be used to validate that windshield defog is likely enabled (e.g., as was determined at operation 204) to reduce condensation that is present on the windshield of the vehicle. If it is not determined that the outside air temperature is within the predetermined temperature range, flow branches "NO" and returns to operation 202. In other examples, method 200 may terminate.

However, if it is determined that the temperature is within the predetermined temperature range, flow instead branches "YES" to operation 210, where an indication is generated to enable a headlamp heater (e.g., headlamp heater 128 of headlamp assembly 110 in FIG. 1). In examples, the indication is that the rule described by method 200 is satisfied, thereby causing a headlamp heat controller to enable the headlamp heater accordingly. In other examples, operation 210 comprises configuring one or more relays to provide power to the headlamp heater. As described above, the headlamp heater may be enabled for a predetermined amount of time or may be enabled for the duration that determinations 204 and 208 are both "YES." It will be appreciated that any of a variety of other techniques may be used to enable the headlamp heater at operation 210. Flow terminates at operation 210.

FIG. 2B illustrates an overview of an example method 250 for determining HVAC state. In examples, method 250 is performed by an ECU. For example, method 250 may be performed by headlamp heat controller 118 of ECU 102 in FIG. 1. In examples, aspects of method 250 are performed as part of operation 202 in method 200 of FIG. 2A. Method 250 begins at operation 252, where a speed of an HVAC blower (HVAC blower 124 in FIG. 1) is determined. In examples, the speed is determined based on listening for data associated with the HVAC blower on a CAN bus. As another example, vehicle state information is requested from an HVAC controller (e.g., HVAC controller 116 in FIG. 1) via the CAN bus. It will be appreciated that any of a variety of other communication techniques may be used.

Flow progresses to determination 254, where it is determined whether the HVAC blower speed is above a predetermined speed threshold. In examples, the predetermined speed threshold is selected as a threshold above which the HVAC system may be in a windshield defog operating mode. For example, the predetermined speed threshold may be 90%. If it is determined that the blower speed is not above the predetermined threshold, flow branches "NO" and returns to operation 252. Thus, it will be appreciated that method 250 may be performed continually or repeatedly. In other examples, method 250 may terminate and may instead be periodically performed or may be performed in response to an event (e.g., when an indication is received from an HVAC controller, when a user input is received, etc.).

If, however, it is determined that the blower speed is above the predetermined threshold, flow instead branches "YES" to operation 256, where thermal output of the HVAC system (e.g., HVAC heater 126 in FIG. 1) is determined. In examples, the thermal output is determined based on listening for data associated with an HVAC heater on a CAN bus. As another example, vehicle state information is requested from an HVAC controller (e.g., HVAC controller 116 in FIG. 1) via the CAN bus. It will be appreciated that any of a variety of other communication techniques may be used.

At determination 258, it is determined whether the output of the HVAC heater is above a predetermined threshold. In examples, the predetermined threshold is selected as a threshold above which the HVAC system may be in a windshield defog operating mode. For example, the predetermined threshold may be 90%. If it is determined that the thermal output is not above the predetermined threshold, flow branches "NO" and returns to operation 252. In other examples, method 250 may terminate.

However, if it is determined that the output is above the predetermined threshold, flow instead branches "YES" to operation 260, where an indication is generated that windshield defog is active. For example, the indication may be used at determination 204 of method 200 in FIG. 2A to conclude that windshield defog is active. Flow terminates at operation 260.

Figure 3:
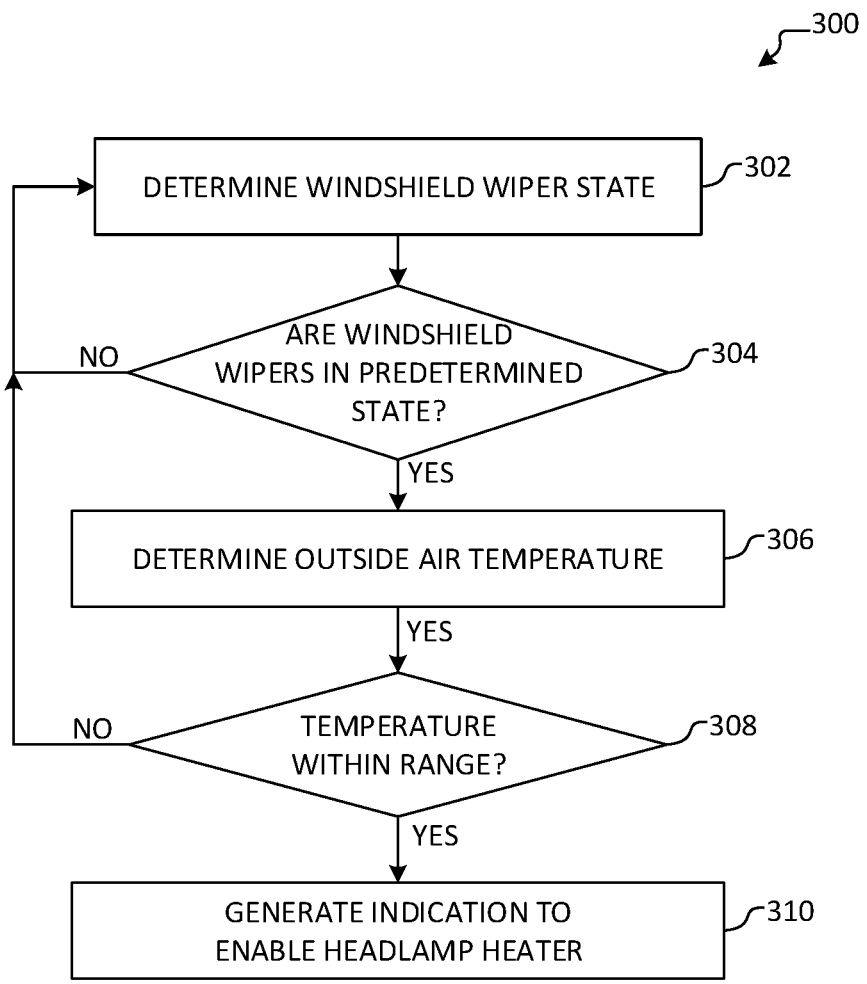
FIG. 3 illustrates an overview of an example method for enabling a headlamp heater based at least in part on windshield wiper state.

FIG. 3 illustrates an overview of an example method 300 for enabling a headlamp heater based at least in part on windshield wiper state. In examples, method 300 is performed by an ECU. For example, method 300 may be performed by headlamp heat controller 118 of ECU 102 in FIG. 1 when the headlamp heat controller is processing a rule. Method 300 begins at operation 302, where a windshield wiper state is determined. In examples, the windshield wiper state is determined based on vehicle state information transmitted via a CAN bus that is associated with a windshield wiper controller (e.g., windshield wiper controller 114 in FIG. 1). In other examples, the determination may be made by requesting vehicle state information from the windshield wiper controller accordingly. Example vehicle state information includes, but is not limited to, a speed and/or interval with which a windshield wiper assembly (e.g., wiper assembly 106 in FIG. 1) is operating, whether the windshield wipers are currently enabled, and/or a state of a control element associated with the windshield wiper assembly. Accordingly, it will be appreciated that any of a variety of techniques may be used to determine the windshield wiper state.

Flow progresses to determination 304, where it is determined whether the windshield wipers are in a predetermined state (e.g., whether they are enabled, operating at a certain interval, etc.) based on the vehicle state information that was determined at operation 302. For example, the determination comprises evaluating the speed, interval, and/or state of the control element associated with the wiper assembly. In examples, the determination is a binary determination (e.g., whether the wipers are enabled) or may be based on a threshold (e.g., whether the interval and/or speed is above a predetermined threshold). If it is determined that the wipers are not in the predetermined state, flow branches "NO" and returns to operation 302. Thus, it will be appreciated that method 300 may be performed continually or repeatedly. In other examples, method 300 may terminate and may instead be periodically performed or may be performed in response to an event (e.g., when an indication is received from a windshield wiper controller, when a user input is received, etc.).

If, however, it is determined that the windshield wipers are in the predetermined state, flow instead branches "YES" to operation 306, where the outside air temperature is determined. In examples, the outside air temperature is determined from a temperature sensor of the vehicle, such as temperature sensor 122 of mirror assembly 104 in FIG. 1. It will be appreciated that the outside air temperature may be determined from any of a variety of other sources. In some examples, multiple temperature sensors are used, such that temperature readings may be averaged, the maximum temperature reading may be used, or the minimum temperature reading may be used, among other examples.

Flow progresses to determination 308, where it is determined whether the outside air temperature is within a predetermined temperature range. For example, the predetermined temperature range may be selected based on conditions in which it is possible for precipitation to freeze (e.g., generally, on a lens of a headlamp assembly, etc.), such as when the outside air temperature is between −9 degrees and 5 degrees Celsius. Such a range may be used to validate that the windshield wipers are likely enabled (e.g., as was determined at operation 304) in response to precipitation that is present on the windshield of the vehicle. If it is not determined that the outside air temperature is within the predetermined temperature range, flow branches "NO" and returns to operation 302. In other examples, method 300 may terminate.

However, if it is determined that the temperature is within the predetermined temperature range, flow instead branches "YES" to operation 310, where an indication is generated to enable a headlamp heater (e.g., headlamp heater 128 of headlamp assembly 110 in FIG. 1). In examples, the indication is that the rule described by method 300 is satisfied, thereby causing a headlamp heat controller to enable the headlamp heater accordingly. In other examples, operation 310 comprises configuring one or more relays to provide power to the headlamp heater. As described above, the headlamp heater may be enabled for a predetermined amount of time or may be enabled for the duration that determinations 304 and 308 are both "YES." It will be appreciated that any of a variety of other techniques may be used to enable the headlamp heater at operation 310. Flow terminates at operation 310.

Figure 4:
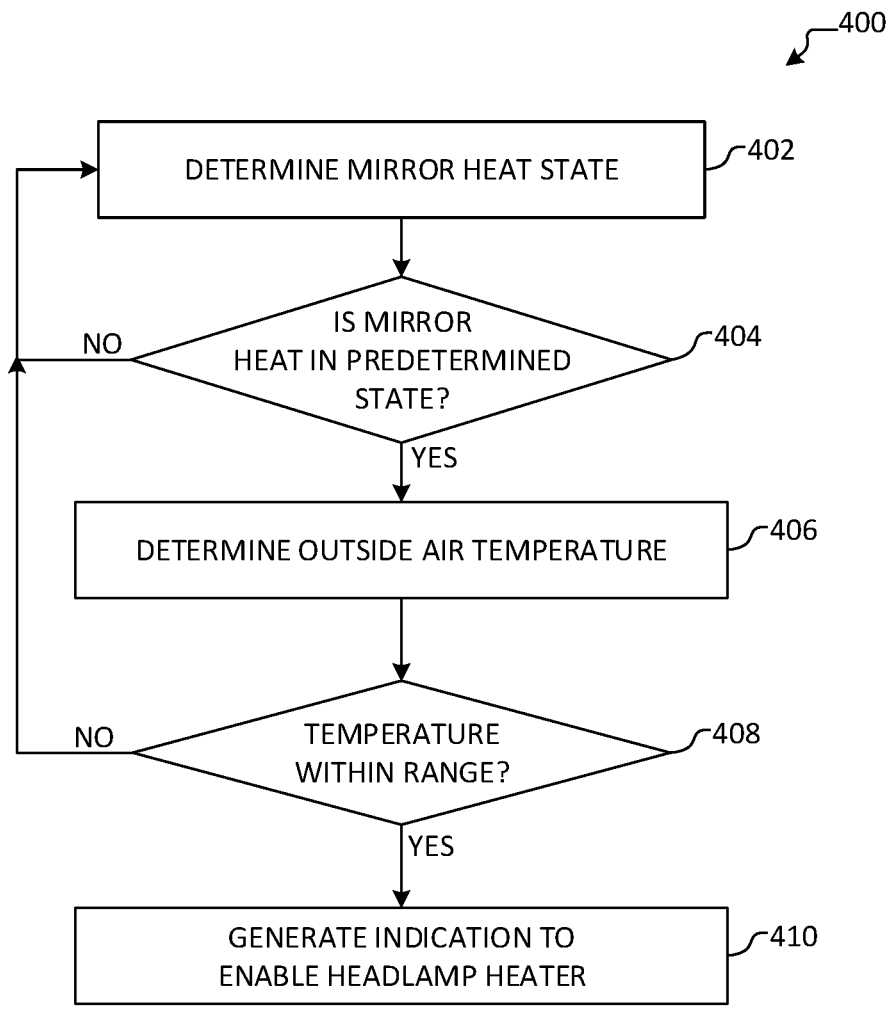
FIG. 4 illustrates an overview of an example method for enabling a headlamp heater based at least in part on mirror heater state.

FIG. 4 illustrates an overview of an example method 400 for enabling a headlamp heater based at least in part on mirror heater state. In examples, method 400 is performed by an ECU. For example, method 400 may be performed by headlamp heat controller 118 of ECU 102 in FIG. 1 when the headlamp heat controller is processing a rule. Method 400 begins at operation 402, where a mirror heat state is determined. In examples, the mirror heat state is determined based on vehicle state information transmitted via a CAN bus that is associated with a mirror heat controller (e.g., mirror heat controller 112 in FIG. 1). In other examples, the determination may be made by requesting vehicle state information from the mirror heat controller accordingly. Example vehicle state information includes, but is not limited to, a temperature setting associated with a mirror heater (e.g., mirror heater 120 in FIG. 1), whether the mirror heater is currently enabled, and/or a state of a control element associated with mirror heat. Accordingly, it will be appreciated that any of a variety of techniques may be used to determine the mirror heat state.

Flow progresses to determination 404, where it is determined whether the mirror heat is in a predetermined state (e.g., whether the mirror heat is enabled) based on the vehicle state information that was determined at operation 402. In examples, the determination is a binary determination (e.g., whether the mirror heater is enabled) or may be based on a threshold (e.g., whether a temperature of the mirror heater is above a predetermined threshold). If it is determined that the mirror heat is not in the predetermined state, flow branches "NO" and returns to operation 402. Thus, it will be appreciated that method 400 may be performed continually or repeatedly. In other examples, method 400 may terminate and may instead be periodically performed or may be performed in response to an event (e.g., when an indication is received from a mirror heat controller, when a user input is received, etc.).

If, however, it is determined that the mirror heat is in the predetermined state, flow instead branches "YES" to operation 406, where the outside air temperature is determined. In examples, the outside air temperature is determined from a temperature sensor of the vehicle, such as temperature sensor 122 of mirror assembly 104 in FIG. 1. It will be appreciated that the outside air temperature may be determined from any of a variety of other sources. In some examples, multiple temperature sensors are used, such that temperature readings may be averaged, the maximum temperature reading may be used, or the minimum temperature reading may be used, among other examples.

Flow progresses to determination 408, where it is determined whether the outside air temperature is within a predetermined temperature range. Given mirror heat may be used in a wide variety of scenarios, the predetermined temperature range may be selected based on temperatures that are not likely to adversely affect a headlamp assembly. For example, the low temperature of the predetermined range may be a temperature below which a lens of the headlamp assembly is likely to experience thermal shock (e.g., −30 degrees Celsius). As another example, the high temperature of the predetermined range may be selected based on a temperature above which a light source (and/or other components) of the headlamp assembly may experience operational issues, such as a decreased lifespan, temporary overheating, etc. (e.g., 20 degrees Celsius). If it is not determined that the outside air temperature is within the predetermined temperature range, flow branches "NO" and returns to operation 402. In other examples, method 400 may terminate.

However, if it is determined that the temperature is within the predetermined temperature range, flow instead branches "YES" to operation 410, where an indication is generated to enable a headlamp heater (e.g., headlamp heater 128 of headlamp assembly 110 in FIG. 1). In examples, the indication is that the rule described by method 400 is satisfied, thereby causing a headlamp heat controller to enable the headlamp heater accordingly. In other examples, operation 410 comprises configuring one or more relays to provide power to the headlamp heater. As described above, the headlamp heater may be enabled for a predetermined amount of time or may be enabled for the duration that determinations 404 and 408 are both "YES." It will be appreciated that any of a variety of other techniques may be used to enable the headlamp heater at operation 410. Flow terminates at operation 410.

Figure 5:
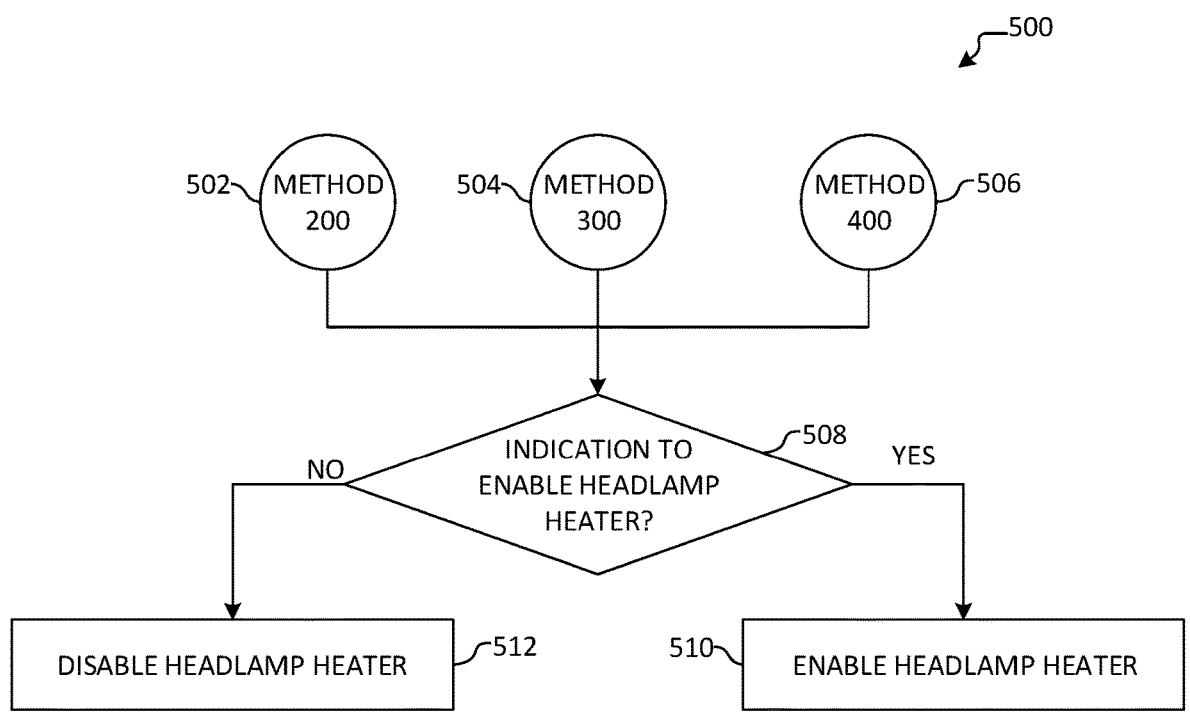
FIG. 5 illustrates an overview of an example method for enabling a headlamp heater based on multiple rules.

FIG. 5 illustrates an overview of an example method 500 for enabling a headlamp heater based on multiple rules. In examples, method 500 is performed by an ECU. For example, method 500 may be performed by headlamp heat controller 118 of ECU 102 in FIG. 1 when the headlamp heat controller is processing a set of rules. In examples, the headlamp heat controller may process a set of rules using method 500 periodically (e.g., every second, every five seconds, every minute, etc.) and/or in response to the occurrence of an event (a received user input, a change in vehicle state information, etc.), among other examples. While method 500 is illustrated as processing three rules (e.g., method 200, 300, and 400), it will be appreciated that any number of rules may be processed according to aspects disclosed herein.

Method 500 begins at operations 502, 504, and 506, where aspects of methods 200, 300, and 400 in FIGS. 2A, 3, and 4, respectively, are performed to determine whether to enable a headlamp heater. Thus, method 500 is provided as an example in which a headlamp heat controller evaluates each rule in a set of rules individually.

Flow progresses to determination 508, where it is determined whether any of operations 502, 504, or 506 generated an indication to enable a headlamp heater (e.g., as may be generated by operations 210, 310, or 410, of methods 200, 300, or 400 in FIG. 2A, 3, or 4, respectively). It will be appreciated that, in other examples, rules may be interdependent such that the determination comprises determining whether multiple rules are satisfied contemporaneously. In examples, each of the rules evaluated at operations 502, 504, and 506 may specify that the headlamp heater should be on while the rule is satisfied and off once the rule is no longer satisfied. In other examples, a rule may indicate that the headlamp heater should be enabled for a predetermined amount of time after a rule is satisfied (e.g., after the rule was first satisfied, last satisfied, etc.).

For example, operation 502 comprising aspects of method 200 may be associated with a rule that indicates the headlamp heater should be enabled for a predetermined amount of defogging time when an HVAC system (e.g., HVAC system 108 in FIG. 1) begins defogging a windshield (e.g., as determined by determination 204 in FIG. 2A) and the outside air temperature is within the associated predetermined range (e.g., determination 208), as it is likely that the windshield will be defogged more quickly than the headlamp assembly, such that the HVAC system will likely stop defogging the windshield sooner than the headlamp heater should be turned off. In such examples, the predetermined amount of defogging time may be tuned based at least in part on the type of the headlamp heater, as certain heater technology may operate more quickly than another heater technology. In such examples, determination 508 may branch "YES" to operation 510, where a headlamp heater continues to be enabled for the duration of the predetermined defogging time.

If it is determined that there is no indication to enable a headlamp heater or an associated time period for which the headlamp heater should remain on, flow branches "NO" to operation 512, where the headlamp heater may be turned off (if the headlamp heater was previously turned on) or may remain off. In examples, operation 512 comprises configuring one or more relays to disconnect power from the headlamp heater. Flow terminates at operation 512.

If, however, it is determined that there is an indication to enable a headlamp heater or an associated time period for which the headlamp heater should remain on, flow instead branches "YES" to operation 510, where the headlamp heater is enabled (if it was previously turned off) or remains on. In examples, operation 512 comprises configuring one or more relays to provide power to the headlamp heater. Flow terminates at operation 510.

Figure 6:
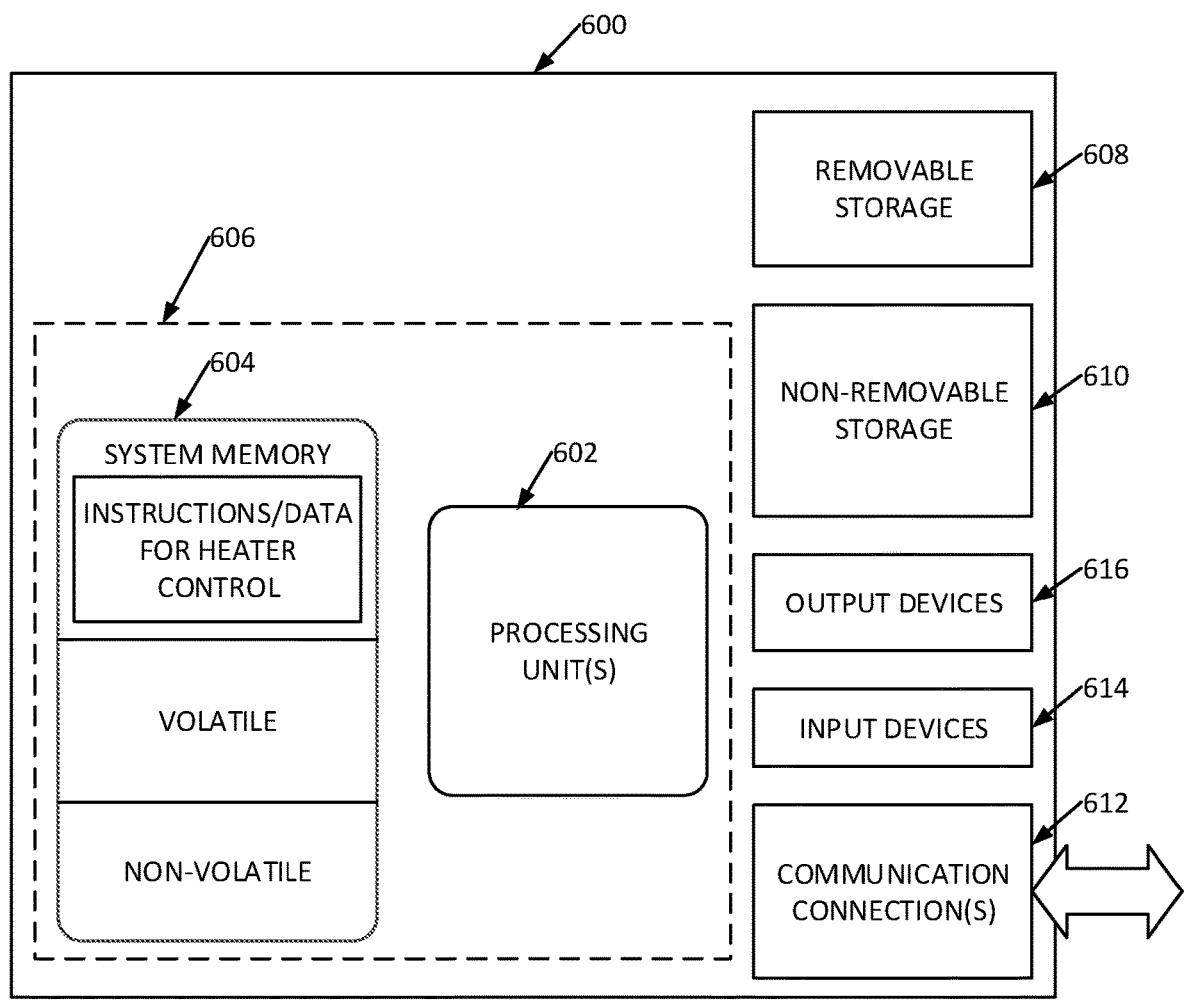
FIG. 6 illustrates an example of a suitable operating environment in which one or more of the present embodiments may be implemented.

FIG. 6 illustrates an example of a suitable operating environment 600 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically may include at least one processing unit 602 and memory 604. Depending on the exact configuration and type of computing device, memory 604 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 6 by dashed line 606. Further, environment 600 may also include storage devices (removable, 608, and/or non-removable, 610) including, but not limited to, magnetic or optical disks or tape. Similarly, environment 600 may also have input device(s) 614 such as a keyboard, mouse, pen, voice input, etc. and/or output device(s) 616 such as a display, speakers, printer, etc. Also included in the environment may be one or more communication connections, 612, such as LAN, WAN, point to point, etc.

Operating environment 600 may include at least some form of computer readable media. The computer readable media may be any available media that can be accessed by processing unit 602 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 604. While executing on the processing unit 602, program modules (e.g., applications, Input/Output (I/O) management, and other utilities) may perform processes including, but not limited to, one or more of the stages of the operational methods described herein such as the methods illustrated in FIGS. 2A-2B, 3, 4, and 5, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 600 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system comprising:
 a headlamp assembly comprising a headlamp heater; and
 an electronic control unit comprising:
  at least one processor; and
  memory, operatively connected to the at least one processor and storing instructions that, when executed by the at least one processor, cause the system to perform a set of operations, the set of operations comprising:
   determining that a state of a controller matches a predetermined state;
   determining that an outside air temperature is within a predetermined temperature range; and
   based on determining that the state of the controller matches the predetermined state and that the outside air temperature is within the predetermined temperature range, enabling the headlamp heater.

2. The system of claim 1, wherein the controller is associated with a heating, ventilation, and air conditioning (HVAC) system, and wherein the predetermined state is one that indicates the HVAC system is configured in a windshield defog operating mode.

3. The system of claim 2, wherein the predetermined temperature range is a temperature range in which condensation forms.

4. The system of claim 1, wherein the controller is associated with a windshield wiper assembly, and wherein the predetermined state indicates that the windshield wiper assembly is enabled.

5. The system of claim 4, wherein the predetermined state further indicates that the windshield wiper assembly is operating at least at a certain speed.

6. The system of claim 4, wherein the predetermined temperature range is a temperature range in which precipitation freezes.

7. The system of claim 1, wherein the controller is associated with a mirror heater, and wherein the predetermined state indicates that the mirror heater is enabled.

8. The system of claim 7, wherein the predetermined temperature range comprises:
 a low temperature that is a thermal shock temperature of the headlamp assembly; and
 a high temperature that is an operational temperature of the headlamp assembly.

9. The system of claim 1, wherein the system further comprises a controller area network (CAN) bus, and wherein the state of the controller is determined based at least in part on identifying data on the CAN bus associated with the controller.

10. The system of claim 1, wherein the electronic control unit further comprises the controller.

11. A method comprising:
 determining a state of a controller of a component of a vehicle;
 determining that the state of the controller matches a predetermined state;
 determining that an outside air temperature is within a predetermined temperature range; and
 based on determining that the state of the controller matches the predetermined state and that the outside air temperature is within the predetermined temperature range, enabling a headlamp heater of a headlamp of the vehicle.

12. The method of claim 11, wherein the controller is associated with a heating, ventilation, and air conditioning (HVAC) system, and wherein the predetermined state is one that indicates the HVAC system is configured in a windshield defog operating mode.

13. The method of claim 12, wherein the predetermined temperature range is a temperature range in which condensation forms.

14. The method of claim 11, wherein the component of the vehicle is a windshield wiper assembly, and wherein the predetermined state indicates that the windshield wiper assembly is enabled.

15. The method of claim 14, wherein the predetermined state further indicates that the windshield wiper assembly is operating at least at a certain speed.

16. The method of claim 11, wherein the controller is associated with a mirror heater, and wherein the predetermined state indicates that the mirror heater is enabled.

17. The method of claim 11, wherein the predetermined temperature range comprises:
   a low temperature that is a thermal shock temperature of a component of the headlamp; and
   a high temperature that is an operational temperature of the headlamp.

18. The method of claim 11, wherein the state of the controller is determined based at least in part on identifying data on a controller area network (CAN) bus associated with the component of the vehicle.

19. The method of claim 11, wherein the component of the vehicle is a mirror heater, and wherein the predetermined state indicates that the mirror heater is enabled.

20. A method comprising:
   determining a state of a controller of a component of a vehicle, wherein the controller is associated with a heating, ventilation, and air conditioning (HVAC) system of the vehicle, and wherein the predetermined state is one that indicates the HVAC system is configured in a windshield defog operating mode;
   determining that the state of the controller matches a predetermined state;
   determining that an outside air temperature is within a predetermined temperature range; and
   based on determining that the state of the controller matches the predetermined state and that the outside air temperature is within the predetermined temperature range, enabling a headlamp heater of a headlamp of the vehicle.

* * * * *